No. 660,835. Patented Oct. 30, 1900.
H. A. BOES.
DRIVING MECHANISM FOR UNICYCLES.
(Application filed Aug. 28, 1899.)

(No Model.)

THE NORRIS PETERS CO., PHOTO-LITHO., WASHINGTON, D. C.

UNITED STATES PATENT OFFICE.

HUBERT ANTON BOES, OF KEVELAER, GERMANY.

DRIVING MECHANISM FOR UNICYCLES.

SPECIFICATION forming part of Letters Patent No. 660,835, dated October 30, 1900.

Application filed August 28, 1899. Serial No. 728,772. (No model.)

*To all whom it may concern:*

Be it known that I, HUBERT ANTON BOES, a subject of the King of Prussia, German Emperor, residing at Kevelaer, in the Kingdom of Prussia, German Empire, have invented certain new and useful Improvements in Driving Mechanism for Unicycles, (for which I have applied for a patent in Germany, dated February 2, 1899; in France, dated February 9, 1899; in Belgium, dated February 9, 1899, and in England, dated February 8, 1899,) of which the following is a specification.

This invention relates to driving mechanism for unicycles which differs from known devices by the transmission of the treadle movement to the running wheel being effected by a hypocycloidal guiding arrangement, the simplicity of the construction insuring its practical utility.

Figure 1:
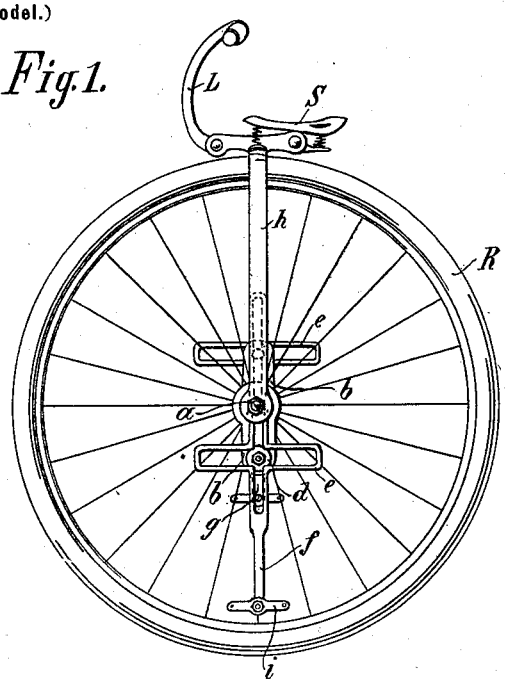
Figure 2:
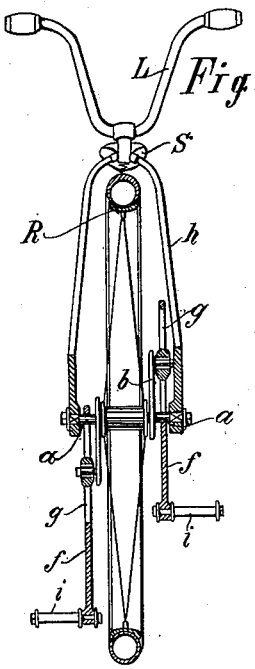
Figure 3:
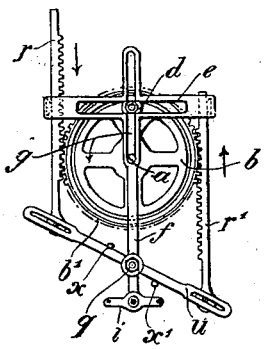
Figure 4:
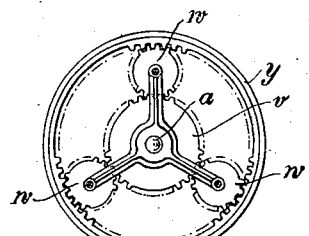

In the accompanying drawings, Figures 1 and 2 show the simplest form of such a driving mechanism in combination with a unicycle. Figs. 3 and 4 are separate modifications of the driving mechanism.

A wheel R, corresponding in size to the average length of limb of cyclists, rotates loosely on an axle $a$ and has a slide-roller $d$ or similar device situated at the side boxes, formed as cranks $b$ and placed at an angle of one hundred and eighty degrees to each other. The roller $d$ engages in the transverse side $e$ of the treadle-levers provided at the sides of the wheel R. In order that the treadle-levers or the transverse slide cannot follow the rotary movements of the slide-roller $d$, but must maintain the vertical up-and-down movement, a second vertical slide $g$ is provided on the treadle-lever $f$ besides the transverse guide $e$, through which slide $g$ passes the fixed axle $a$ of the wheel R. Any side movement of the treadle-lever $f$ is thus prevented. The lower ends of the latter are provided with pedals $i$, and the up-and-down movements of the slides $e$ $g$ do not become tedious to the rider, because the fork $h$ nearly covers the slides. A steering-bar L is provided at a suitable part of the fork $h$; but the purpose thereof is less to effect the steering than to offer a support for the hands. The steering of the wheel is effected by suitable side twists or similar movements of the body of the rider, who is seated on a saddle S.

In the arrangement as described the gearing is simple—*i. e.*, a full treadle movement of each single pedal effects only half a rotation of the circumference of the wheel. A double or multiple transmission may, however, be effected in various ways; but this does not concern the nature of this invention. In Fig. 3 such an arrangement is illustrated as an example. The crank $b$, on which is situated the slide-roller $d$, may be formed as a disk and cog-wheel, with which engage racks $r\ r'$. The outer cogged rim is not, however, rigidly connected with the other part of the device to which the slide-roller $d$ is attached. A ball mechanism or clutch is arranged between these parts, so that during rotation in one direction the friction of the balls firmly connects the cogged rim with the system; but when the rotation is in the opposite direction the parts are disengaged. The racks $r$ and $r'$ are connected to each other by a rod $u$, pivoted at $q$ on the lever $f$. When downward pressure is exerted on the left rack, as shown in the drawings by an arrow, by treading on the pedal $i$ of the treadle-lever treble tangential pressure is exerted on the slide-roller $d$ and on the wheel, the left rack moving downward, the right-hand rack moving upward, and the roller $d$ pressing also on a lever having at first a small moment and afterward an increased moment. This arrangement requires two fixed points $x\ x'$ in close proximity to the rod $u$, against which the latter must bear to be rotated around its pivot $q$. These fixed points can be very easily provided in the form of two pins on an elongation of the fork below the axle of the wheel, or the pivot $q$ is placed in the center of the pedals $i$, and the rod $u$ is rotated by the turning movement of the toes of the feet. This arrangement has the advantage that any dead point of the pedals is avoided.

Another arrangement permitting a multiple transmission may be arranged, after the nature of front driving-wheels, within the spokes of the wheel R. This consists mainly, as shown in Fig. 4, of two rims $y$, having cogs at the inner periphery and fixed to the axle $a$, into which rims engage three small cog-wheels $w$, which engage also with a larger cog-wheel $v$. The latter is fixed to the fork of the wheel and maintains the wheels $w$ in their position by a system of arms. This arrangement has the advantage over that described before that it can be inclosed dust-proof and may be of small weight and dimensions.

When two unicycles provided with the mechanism before described are placed on one axle and the driving devices are placed inward, they form a substitute for tricycles.

What I claim, and desire to secure by Letters Patent of the United States, is—

The combination with the wheel and its axle, of cranks on opposite sides of said wheel, arranged at an angle of one hundred and eighty degrees to each other, treadle-levers provided with fixed treadles and each having one vertical slide and one transverse slide intersecting each other, the said vertical slide of each treadle-lever being arranged to move on the wheel-axle, slide-rollers on the ends of the cranks arranged in the transverse slides of the treadle-levers, and a frame $h$ within which the driving mechanism is arranged and provided with a handle-bar to assist the driving by foot-power, substantially as described.

In testimony whereof I have hereunto set my hand in the presence of two witnesses.

HUBERT ANTON BOES.

Witnesses:
NIKOLAUS HEURER,
WILLIAM H. MADDEN.